UNITED STATES PATENT OFFICE.

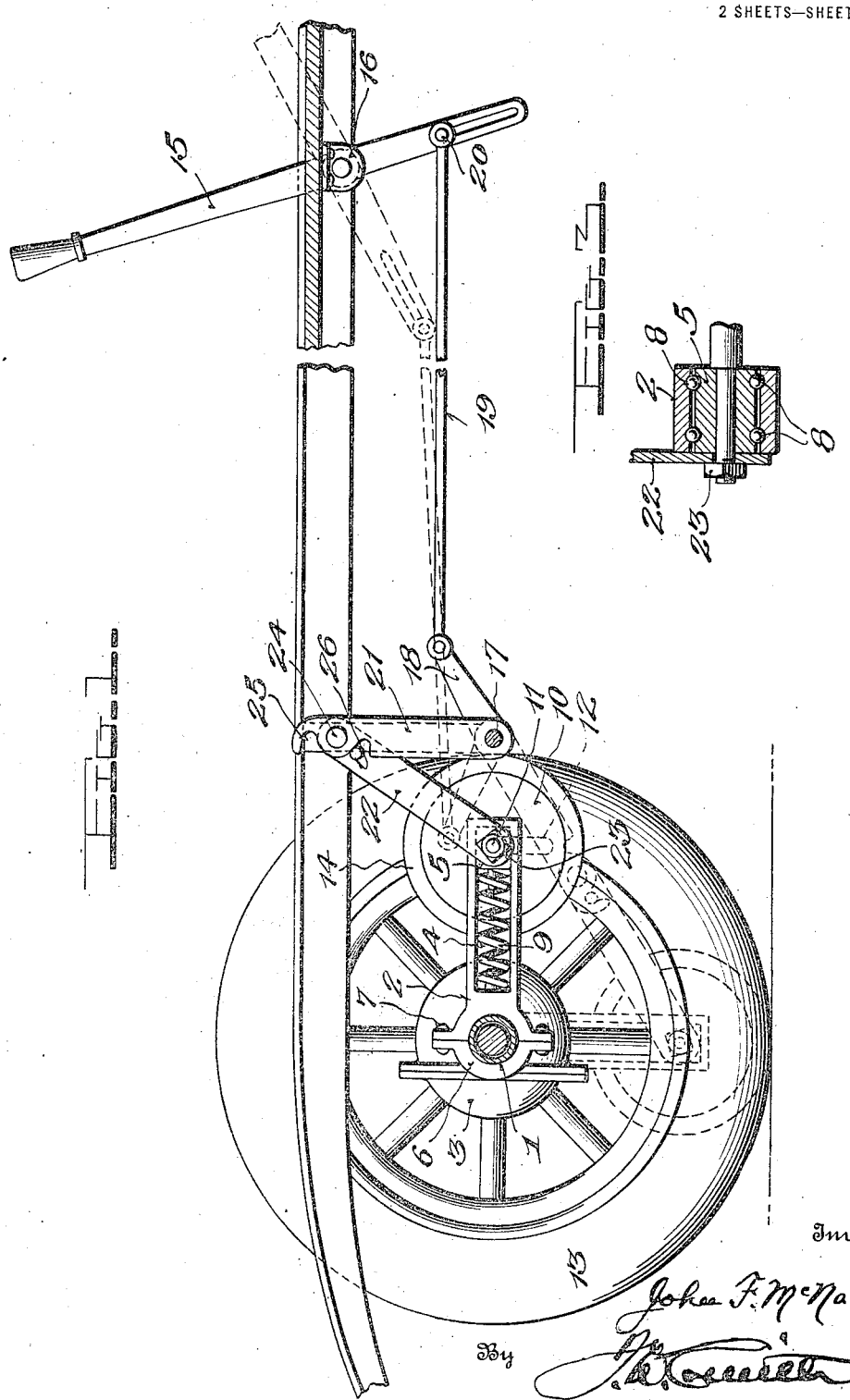

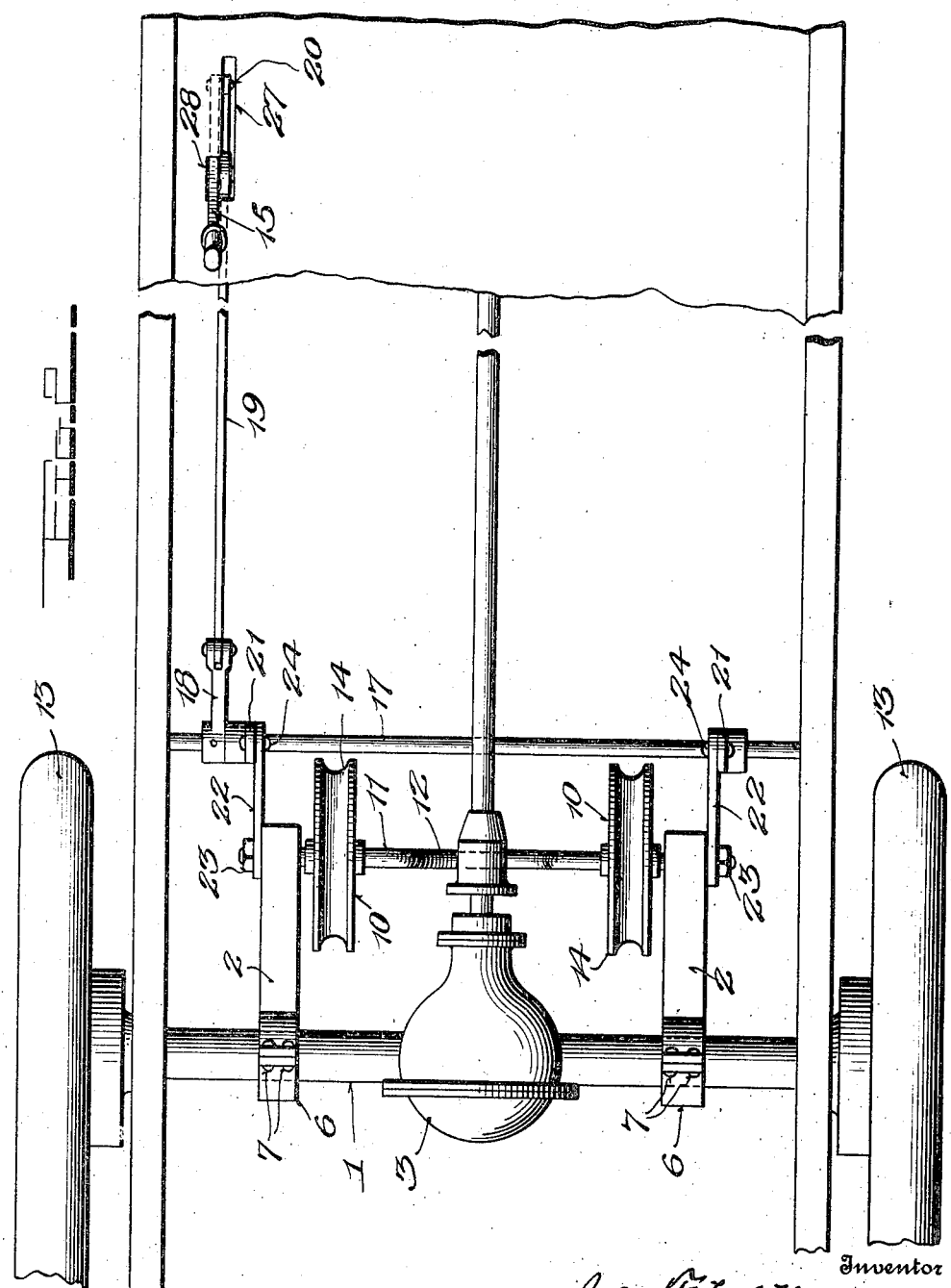

JOHN F. McNAMARA, OF DANBURY, CONNECTICUT.

ANTISKID ATTACHMENT FOR AUTOMOBILES.

1,306,385.  Specification of Letters Patent.  Patented June 10, 1919.

Application filed January 18, 1919. Serial No. 271,766.

*To all whom it may concern:*

Be it known that I, JOHN F. McNAMARA, a citizen of the United States, residing at the city of Danbury, county of Fairfield, State of Connecticut, have invented certain new and useful Improvements in Antiskid Attachments for Automobiles; and I do declare the following to be a full, clear, and exact description of the invention, such as will enable others skilled in the art to which it appertains to make and use the same.

This invention relates to certain new and useful improvements in an antiskid attachment for automobiles, and it has for one of its objects to provide a skid-preventing, wheeled device adapted to be expeditiously lowered into engagement with the roadway by the driver of the vehicle whenever the conditions of the road necessitate its use.

Further, the invention resides in a two-wheeled attachment of durable construction and capable of functioning as an emergency truck for supporting the weight of the rear end of the vehicle in the event of either or both rear wheels becoming disabled.

The invention will further be found in the features of construction and the arrangements and combinations of parts hereinafter described and claimed, reference being had to the accompanying drawings wherein:

Figure 1 is a fragmental side elevation of an automobile equipped with the improved antiskid attachment;

Fig. 2 is a partial top plan view thereof; and

Fig. 3 is a detailed sectional view through one of the mountings for the ends of the axle which supports the skid-preventing wheels.

Referring more in detail to the drawings, the attachment is pivotally mounted on the rear axle housing 1 of the automobile, and comprises a pair of arms 2 arranged on opposite sides of the differential housing 3.

Each arm or support 2 is longitudinally slotted for nearly its full length to provide a guideway 4 for the journal block 5. The upper end of the arm is pivotally connected to the axle housing in any suitable manner, as by providing a seat to receive the housing and securing the latter in its seat by a strap 6 and fasteners 7.

The journal blocks 5 are slidably arranged in the guideway 4 on the ball bearings 8 to minimize the frictional contact between the sliding parts. Coiled springs 9 are interposed between the upper ends of the guideways and the respective journal blocks to exert a downward pressure on the latter.

Two antiskid wheels 10 are provided, the same being journaled on the axle 11 on opposite sides of a central, depending loop or bend 12, which accommodates the differential housing as said axle vibrates vertically and especially when considerable weight or pressure is placed upon the antiskid wheels. In this connection it will be noted that when the antiskid device encounters an obstruction, or in the event that either traction wheel 13, or both, should become dislodged, accidentally or otherwise, considerable more pressure and load will come upon the device so that the wheels 10, their supporting axle 11 and the journal bearings 5 will approach the axle housing 1 and the central looped portion 12 of the axle will straddle the differential housing to reinforce the device and make it doubly secure. The tires 14 for the wheels 10 have grooved peripheries which afford a firm grip or engagement with the roadway. Under normal conditions, these tires are preferably formed of rubber or a vulcanizable compound thereof, but in winter when the roadway is more or less icy, these tires can be made of steel.

For raising and lowering the skid-preventive device, a system of levers are interposed between for connecting the device to the control lever 15 which is located in the fore part of the vehicle adjacent the driver's seat, being pivoted to a floor bracket 16 so that its lower end depends therebeneath.

Intermediate the lever 15 and the device is a rock shaft 17 having a crank arm 18 connected to one end of a link 19 which has a play connection 20 at its opposite end with the lower end of the control and operating lever. At spaced points on the shaft 17 is a pair of lift arms 21, the same being located adjacent the swinging supports 2 and connected at their outer or free ends to the ends of the axle 11, that protrude beyond the journal bearings 5 by links 22. Nuts 23 secure the links 22 to the axle and against the bearing blocks, while pivot pins 24 connect the links 22 to their respective lift arms 21. The free ends of the lift arms project slightly beyond the pivots 24 and are provided with notches 25 adapted to receive lateral stop pins 26 on the links 22, when the latter and the lift arms are relatively extended. This connection affords an efficient lock against upward breaking of these parts so that the wheels 10 will be held firmly down on the roadway. As a means for holding the device elevated, the floor slot 27, through which control lever 15 operates, is formed with an offset 28 into which the lever may be shifted laterally.

When it is desired to apply the antiskid device, the operator merely disengages the control lever from the notch or offset 28 and shifts it forwardly to rock the shaft which effects downward movement of the lift arms, and the latter being linked to the swinging supports the wheels 10 will be brought down into engagement with the roadway. By reason of their direct mounting on the rear axle housing the wheels 10 will engage the roadway intermediate the rear wheels of the vehicle and in alinement with their point of contact with the roadway. This arrangement is especially desirable since the antiskid wheels so disposed will not interfere with the steering of the automobile. The wheels will also secure a firm grip on the roadway, their pressure thereon being practically uniform since they yield with the axle of the vehicle and not with the frame.

What is claimed is:

1. An antiskid attachment for automobiles, comprising, in combination with an automobile, a pair of supporting arms slotted longitudinally to provide guideways and rotatably mounted on the rear axle housing of the automobile on opposite sides of the differential housing, bearing blocks slidable in the guideways of the arms, coiled springs interposed between the upper ends of the guideways and the blocks, an axle having its ends supported in the blocks and its central portion looped downwardly to straddle the differential housing, wheels mounted on axle on opposite sides of the central looped portion, and means for raising and lowering the wheels from and into engagement with the roadway.

2. An antiskid attachment for automobiles, comprising, in combination with an automobile, a pair of supporting arms slotted longitudinally to provide guideways and rotatably mounted on the rear axle housing of the automobile on opposite sides of the differential housing, bearing blocks slidable in the upper ends of the guideways and the blocks, an axle having its ends supported in the blocks, and projecting therethrough, wheels on the axle between the arms, a rock shaft, spaced arms fixed thereon, links connecting the fixed arms to the projecting ends of the axle, means for positively holding the fixed arms and their connected links in extended relation to hold the wheels in engagement with the roadway, and means for rocking the shaft to raise and lower the wheels.

3. In an antiskid attachment for automobiles, a wheeled frame adapted for pivotal connection with the rear axle housing of an automobile, said frame including an axle, wheels on the axle, a rock shaft, arms fixed on the shaft, links connected at one end to the axle and at their opposite ends to the fixed arms adjacent their free ends, said free ends of the arms extending beyond the link connection and formed with notches, lateral pins carried by the links to enter the arm notches for holding the links and fixed arms extended, and means for rocking the shaft to raise and lower the wheels.

In testimony whereof I affix my signature.

JOHN F. McNAMARA.

Witnesses:
FRANK MOORE,
GEORGE C. HANNA.